United States Patent
Yokouchi et al.

(10) Patent No.: US 8,297,068 B2
(45) Date of Patent: Oct. 30, 2012

(54) MOTOR CONTROL DEVICE, ITS CONTROL METHOD, AND MOTOR DEVICE

(75) Inventors: Yasuyuki Yokouchi, Fukui (JP); Yasushi Kato, Fukui (JP)

(73) Assignee: Panasonic Corporation, Osaka (JP)

( * ) Notice: Subject to any disclaimer, the term of this patent is extended or adjusted under 35 U.S.C. 154(b) by 560 days.

(21) Appl. No.: 12/532,003

(22) PCT Filed: Mar. 7, 2008

(86) PCT No.: PCT/JP2008/000486
§ 371 (c)(1),
(2), (4) Date: Sep. 18, 2009

(87) PCT Pub. No.: WO2008/117515
PCT Pub. Date: Oct. 2, 2008

(65) Prior Publication Data
US 2010/0101265 A1 Apr. 29, 2010

(30) Foreign Application Priority Data
Mar. 27, 2007 (JP) .................................. 2007-080941

(51) Int. Cl.
*B60H 1/32* (2006.01)

(52) U.S. Cl. .......................................... 62/239; 62/426

(58) Field of Classification Search .................... 62/426, 62/228.1, 125, 239; 318/245, 618, 778, 779; 700/275; 363/34; 417/18, 22; 454/239, 454/229
See application file for complete search history.

(56) References Cited

U.S. PATENT DOCUMENTS

| | | | | |
|---|---|---|---|---|
| 5,463,299 A | * | 10/1995 | Futami et al. | 318/618 |
| 5,629,598 A | * | 5/1997 | Wilkerson | 318/808 |
| 6,014,004 A | * | 1/2000 | Hamaoka et al. | 318/778 |
| 6,246,207 B1 | * | 6/2001 | VanSistine et al. | 318/801 |
| 7,084,598 B2 | * | 8/2006 | Yoshida et al. | 318/400.11 |
| 2004/0168454 A1 | * | 9/2004 | Iritani | 62/230 |
| 2005/0057201 A1 | * | 3/2005 | Branecky et al. | 318/109 |
| 2006/0006655 A1 | * | 1/2006 | Kanazawa et al. | 290/40 B |
| 2006/0179859 A1 | * | 8/2006 | Nakata et al. | 62/228.1 |
| 2006/0237247 A1 | * | 10/2006 | Severinsky et al. | 180/65.4 |

FOREIGN PATENT DOCUMENTS

| | | |
|---|---|---|
| JP | 06-153579 | 5/1994 |
| JP | 2002-165477 A | 6/2002 |

OTHER PUBLICATIONS

Translation of JP 2002-165477 to Sasamoto et al.*
International Search Report for International Application No. PCT/JP2008/000486, Apr. 8, 2008.

* cited by examiner

*Primary Examiner* — Mohammad Ali
(74) *Attorney, Agent, or Firm* — RatnerPrestia

(57) ABSTRACT

A motor control device controls a fan motor, and controls a motor speed so as to maintain a predetermined airflow value. For this, the motor control device includes an input terminal for inputting a first operation parameter indicating the motor speed or a second operation parameter indicating a motor torque. Moreover, the motor control device includes a motor-speed target value arithmetically-operating unit that calculates, using a predetermined airflow value and the motor torque, a necessary modified value for the motor speed at the predetermined time intervals. Further, the motor control device includes an output terminal that outputs an instruction speed of the motor based on the necessary modified value.

21 Claims, 5 Drawing Sheets

MOTOR CONTROL DEVICE, ITS CONTROL METHOD, AND MOTOR DEVICE

This application is a U.S. National Phase Application of PCT International Application PCT/JP2008/000486.

TECHNICAL FIELD

The present invention relates to a motor control device and its control method, and a motor device. More particularly, the present invention relates to an airflow control method of a fan motor that performs motor control of an air conditioner or the like, or a blower of a ventilator or the like.

BACKGROUND ART

In recent years, a ventilator or an air conditioning system of an air conditioner is required to perform control so as to keep a predetermined airflow value even when static pressure varies due to clogging of a filter or a state of a vent provided at an air outlet, in order to optimize a state of a room or the air conditioning system.

As a technique for keeping the predetermined airflow value, for example, Patent Document 1 is known. According to the conventional art described in Patent Document 1, a relationship between a motor applied voltage and a motor speed is represented by equation (1).

$$N = 1.027 \times Kt \times V/(Kp \times R \times Q \times D^2 + 1.027 \times Kt \times Ke) \quad \text{Equation (1)}$$

Here, if a static pressure coefficient is Kp, a diameter of an impeller is D, a torque constant is Kt, a total resistance of an armature circuit is R, and an induced voltage constant is Ke, prescribed motor speed N is calculated from instruction airflow Q and applied voltage V to control applied voltage V so that an operating motor speed and the prescribed motor speed are equal.

In the conventional art described in Patent Document 1, in a process of deriving equation (1), motor current I is found from applied voltage V to the motor, and total resistance R of the armature circuit and induced voltage E, based on a relationship of equation (2).

$$V = E + I \times R \quad \text{Equation (2)}$$

In other words, instead of controlling motor current I, applied voltage V to the motor is controlled. However, there is a problem in that since total resistance R of the armature circuit varies due to heat generation of the motor and atmosphere temperature, motor current I cannot be accurately controlled due to the influence of total resistance R of the armature circuit even when applied voltage V to the motor is controlled, an error of the airflow occurs by the heat generation of the motor and the atmosphere temperature.

The present invention is made to solve the above conventional problem, and an object thereof is to provide a motor control device capable of maintaining a predetermined airflow value precisely by detecting a current of a motor against change factors such as temperature change, and its control method, and a motor device.

[Patent Document 1] Unexamined Japanese Patent Publication No. 6-153579

DISCLOSURE OF THE INVENTION

A motor control device of the present invention is a device that controls a motor that drives a fan, including an input terminal for inputting at least one of a first operation parameter indicating a motor speed and a second operation parameter indicating a motor torque. Moreover, the motor control device includes a motor-speed target value arithmetically-operating unit that calculates, using a predetermined airflow value and the motor torque, a necessary modified value for the motor speed at predetermined time intervals. Further, the motor control device includes an output terminal that outputs an instruction speed of the motor based on the necessary modified value so as to control the motor speed so that the predetermined airflow value is maintained.

According to the configuration, the motor control device capable of performing the control so as to precisely attain the predetermined airflow value without occurrence of an error due to heat generation of the motor or an atmosphere temperature can be provided. Moreover, according to the motor control device of the present invention, by using torque information of the motor, the instruction speed necessary for the predetermined airflow value can be found precisely without being affected by the temperature, and the predetermined airflow value can be maintained more precisely.

Moreover, target motor speed Sa bringing about the predetermined airflow value is represented by equation (3), where T is the motor torque, Q* is the predetermined airflow value, knm (n=0, 1, 2, . . . , j, m=0, 1, 2, . . . , i) is a constant, and i and j are finite values. By representing instruction speed S* by equation (4), motor speed S can be brought close to target motor speed Sa, and thus, brought close to instructed, predetermined airflow value Q*.

$$Sa = \sum_{n=0}^{j}\left(\sum_{m=0}^{i}(k_{nm}T^n Q^{*m})\right) \quad \text{Equation (3)}$$

$$S^* = S + K \times (S - S_a) \quad \text{Equation (4)}$$

Moreover, a motor control method of the present invention has the following steps for controlling a motor that drives a fan. The motor control method includes a first step of recognizing a first operation parameter indicating a motor speed, and a second step of recognizing a second operation parameter indicating a motor torque. The motor control method further includes a third step of calculating, using a predetermined airflow value and the motor torque, a necessary modified value for the motor speed at predetermined time intervals, and a fourth step of outputting an instruction speed of the motor based on the necessary modified value. Thereby, the motor speed is controlled so that the predetermined airflow value is maintained.

According to the method, by using the torque information of the motor, the instruction speed necessary for the predetermined airflow value can be found precisely without being affected by temperature, and the predetermined airflow value can be maintained more precisely.

Moreover, a motor device of the present invention has a fan, a motor that drives the fan, and a motor drive device that controls the motor. The motor drive device includes an inverter that converts a DC power supply to AC to drive the motor, a first detector that detects a first operation parameter indicating a motor speed, a second detector that detects a second operation parameter indicating a motor torque, and a motor control device. Furthermore, the motor control device includes a motor-speed arithmetically-operating device that calculates, using at least a predetermined airflow value by the fan and the motor torque, a necessary modified value for the motor speed at predetermined time intervals and outputs an instruction speed based on the modified value. Thereby, driving of the motor is controlled in accordance with the instruction speed, and the driving of the motor is controlled at a speed allowing the predetermined airflow value to be attained.

According to the configuration, by using the torque information of the motor, the instruction speed necessary for the predetermined airflow value can be found precisely without being affected by temperature, and the predetermined airflow value can be maintained more precisely.

Moreover, the present invention includes an air conditioner with the above-described motor device mounted. The air conditioner is installed in a house for general household, a business building, a clean room or the like, and even when a static pressure varies, the predetermined airflow value can be kept.

REFERENCE MARKS IN THE DRAWINGS

Figure 1:
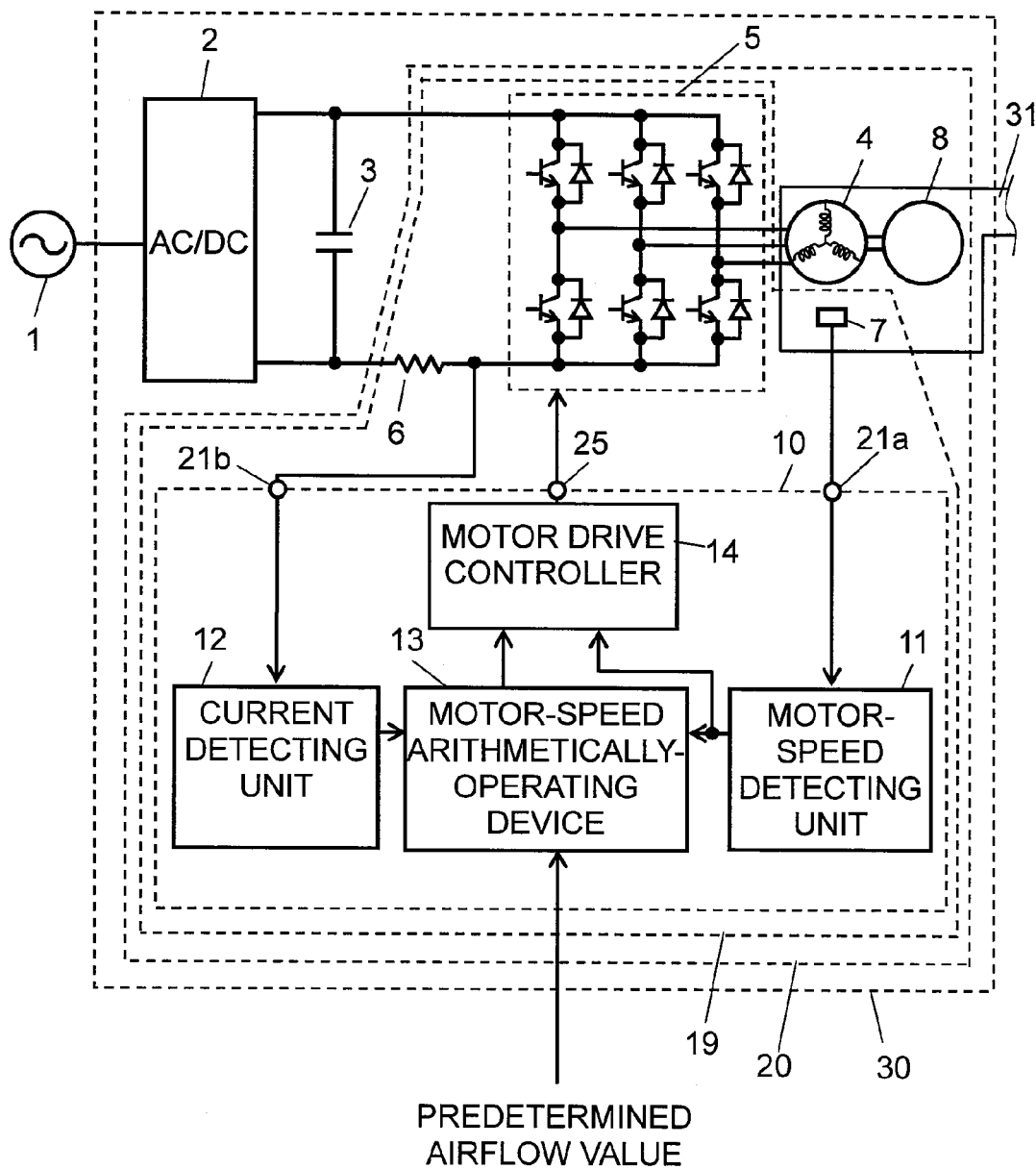
FIG. 1 is a block diagram showing a configuration of a first embodiment of the present invention.

1 AC power source
2 AC/DC conversion circuit
3 Capacitor
4 Motor
5 Inverter
6 Current detector (Second detector)
7 Speed sensor (First detector)
8 Fan
10 Motor control device
11 Motor-speed detecting unit
12 Current detecting unit
13 Motor-speed arithmetically-operating device
13a Motor-speed target value arithmetically-operating unit
13b Gain K
13c Torque converter
13d Memory
13e Switch
13f Communication unit
14 Motor drive controller
15 Communication unit
16 First unit
17 Second unit
19 Motor drive device
20 Motor device
21a, 21b Input terminal
25 Output terminal
30 Air conditioner
31 Air passage Preferred Embodiments for Carrying out of the Invention A motor control device of the present invention controls a motor that drives a fan. The motor control device includes an input terminal into which at least one of a first operation parameter indicating a motor speed and a second operation parameter indicating a motor torque is inputted. The motor control device also includes a motor-speed target value arithmetically-operating unit that calculates, using a predetermined airflow value and the motor torque, a necessary modified value for the motor speed at predetermined time intervals. The motor control device further includes an output terminal that outputs an instruction speed of the motor based on the necessary modified value. With the configuration, the motor control device capable of maintaining the predetermined airflow value by controlling the speed of the motor in accordance with the instruction speed can be realized.

For example, motor speed S is found from a motor speed detector and a motor current is found from a current detector, respectively, the obtained motor current is converted to torque T, and instruction speed S* is calculated from equation (5) using predetermined airflow value Q* to periodically control the motor in accordance with the calculated instruction speed. Here, K denotes a gain, and k00, k01, k10, k11, k20 and k21 each denotes a constant.

$$S^* = S + K \times \{S - ((k_{21} \times T^2 \times Q^*) + (k_{20} \times T^2) + (k_{11} \times T \times Q^* + (k_{10} \times T) + (k_{01} \times Q^*) + k_{00})\} \quad \text{Equation (5)}$$

Hereinafter, embodiments of the present invention are described with reference to the drawings.

(First Embodiment)

FIG. 1 is a block diagram showing a first embodiment of the present invention. First, a basic configuration of a motor control device of the first embodiment of the present invention shown in FIG. 1 is as follows.

Motor control device 10 that controls motor 4 so as to maintain a predetermined airflow value has input terminals for inputting any one of input terminal 21a for inputting a first operation parameter indicating a motor speed and input terminal 21b for inputting a second operation parameter indicating a motor torque. Moreover, motor control device 10 has motor-speed arithmetically-operating device 13 that calculates a necessary modified value for the motor speed at predetermined time intervals, using at least the predetermined airflow value and the motor torque. Furthermore, motor control device 10 has motor drive controller 14 that outputs a necessary instruction speed based on the modified value necessary for controlling the speed of the motor at a speed allowing the predetermined airflow value to be attained, and output terminal 25 that outputs the instruction speed.

Moreover, a basic configuration of motor device 20 of the first embodiment of the present invention shown in FIG. 1 is as follows. Motor device 20 that operates so as to maintain the predetermined airflow value includes fan 8, motor 4 that drives fan 8, and motor drive device 19 that controls motor 4. Motor drive device 19 includes inverter 5 that converts a DC power supply to AC to drive motor 4, first detector 7 that detects the first operation parameter indicating the motor speed, second detector 6 that detects the second operation parameter indicating the motor torque, and motor control device 10.

Motor control device 10 includes motor-speed arithmetically-operating device 13 that calculates the necessary modified value for the motor speed at the predetermined time intervals, using at least the predetermined airflow value by fan 8 and the motor torque, and outputs the instruction speed based on the modified value. Furthermore, motor control device 10 has motor drive controller 14 that outputs the necessary instruction speed based on the modified value necessary for controlling the speed of the motor at the speed allowing the predetermined airflow value to be attained.

Moreover, a basic configuration when the first embodiment of the present invention shown in FIG. 1 is applied to an air conditioner is as follows. Air conditioner 30 that maintains the predetermined airflow value has air passage 31, and motor 4 having fan 8 serving as a blowing unit that blows air to air passage 31. Moreover, air conditioner 30 has speed sensor 7 as the first detector that detects the first operation parameter indicating the motor speed, and current detector 6 as the second detector that detects the second operation parameter indicating the motor torque.

Moreover, air conditioner 30 calculates the necessary modified value for the motor speed at the predetermined time intervals, using at least the predetermined airflow value and the motor torque. Air conditioner 30 has motor-speed arithmetically-operating device 13 that outputs the necessary instruction speed based on the necessary modified value, and motor drive controller 14 that controls the driving of motor 4 in accordance with the necessary instruction speed to control the driving of the motor at the speed allowing the predetermined airflow value to be attained.

Next, the present embodiment shown in FIG. 1 is described in more detail. In FIG. 1, in the present embodiment, there are included AC power source 1, AC/DC conversion circuit 2 that converts AC of AC power source 1 to DC, capacitor 3 that smoothes a DC voltage of output of AC/DC conversion circuit 2, motor 4 and fan 8. In the first embodiment, also, inverter 5 made of a switching circuit that converts a DC voltage of capacitor 3 to AC to drive motor 4, and current detector 6 that detects a DC current outputted from inverter 5 are included.

In the first embodiment, there are also included speed sensor 7 that detects the speed of a rotator of the motor, and motor control device 10 that controls inverter 5. Motor control device 10 has motor-speed detecting unit 11 that detects the speed from speed sensor 7, current detecting unit 12 that detects the current of motor 4 from a signal of current detector 6, and motor-speed arithmetically-operating device 13 that calculates the instruction speed based on information from motor-speed detecting unit 11 and current detecting unit 12.

Next, operation of FIG. 1 is described. The AC current from AC power source 1 is converted to DC in AC/DC conversion circuit 2, and smoothed by capacitor 3. At both terminals of capacitor 3, a DC voltage occurs and is inputted into inverter 5 through current detector 6. Six transistors making up inverter 5 are switched to drive the motor. Since the current flowing through motor 4 flows through inverter 5 and current detector 6, the current is detected by a voltage induced at both terminals of current detector 6. The current detected in current detector 6 is averaged, for example, by a filter or the like. Speed sensor 7 is attached so as to generate a signal in accordance with the rotation of motor 4. As long as the configuration is such that the motor speed can be detected, the ability to estimate the motor speed from the motor current or the like may eliminate the use of speed sensor 7.

In motor-speed detecting unit 11, the motor speed of motor 4 is detected from the signal from speed sensor 7. The motor speed detected here is outputted to motor-speed arithmetically-operating device 13 and motor drive controller 14. Motor-speed arithmetically-operating device 13 arithmetically operates a motor instruction speed of a next arithmetic operation period, using the set airflow (predetermined airflow value), the motor current detected in current detecting unit 12, and the motor speed detected in motor-speed detecting unit 11.

Figure 2:
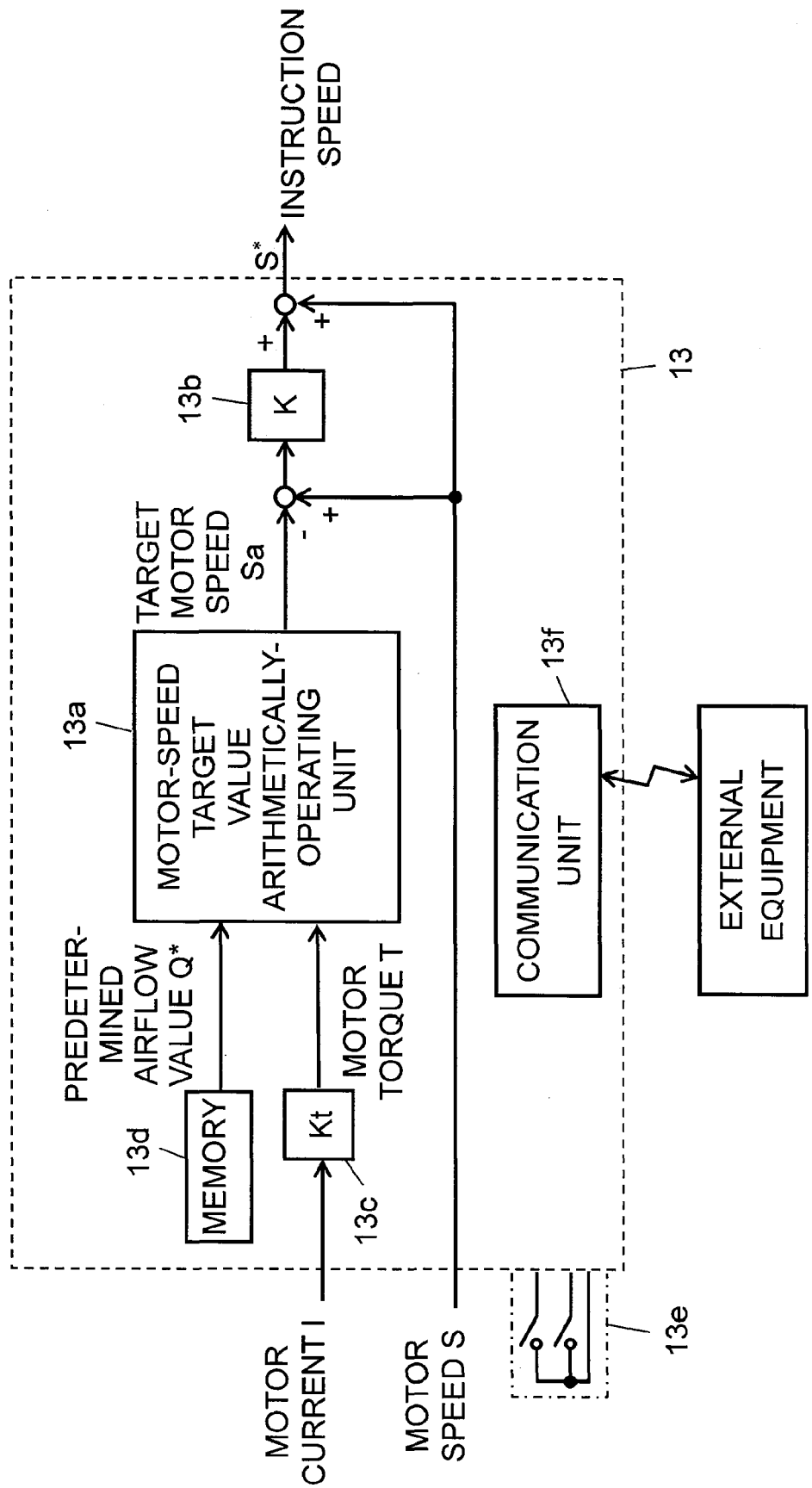
FIG. 2 is a block diagram of an inside of a motor-speed arithmetically-operating device in the first embodiment of the present invention.

Next, FIG. 2 shows a control block diagram of an inside of motor-speed arithmetically-operating device 13. Motor-speed arithmetically-operating device 13 has motor-speed target value arithmetically-operating unit 13a, torque converter 13c and memory 13d. As show in FIG. 2, motor current I detected by current detecting unit 12 is converted to motor torque T through torque converter 13c, and motor-speed target value arithmetically-operating unit 13a arithmetically operates target motor speed Sa by equation (6), using the set airflow (predetermined airflow value) and the motor torque.

$$Sa = \sum_{n=0}^{j}\left(\sum_{m=0}^{i}(k_{nm}T^n Q^{*m})\right) \quad \text{Equation (6)}$$

where T is the motor torque, $Q^*$ is the set airflow, $k_{nm}$ (m=0, 1, 2, . . . , i, n=0, 1, 2, . . . , j) is a constant, and i and j are finite values.

Next, the derivation of equation (6) is described. A relationship between motor torque T and motor speed S to attain the predetermined airflow value even when a static pressure is varied is approximated by equation (7).

$$S = \sum_{n=0}^{j}(a_n T^n) \quad \text{Equation (7)}$$

where $a_n$ (n=0, 1, 2, . . . , j) is a constant, and j is a finite value. Further, if an approximation of equation (8) is performed where constant $a_n$ is a function of airflow Q, then equation (9) is found from equations (7) and (8).

$$a_n = \sum_{m=0}^{i}(k_{nm} Q^m) \quad \text{Equation (8)}$$

where $k_{nm}$ (m=0, 1, 2, . . . , i, n=0, 1, 2, . . . , j) is a constant, and i and j are finite values.

$$S = \sum_{n=0}^{j}\left(\sum_{m=0}^{i}(K_{nm}T^n Q^m)\right) \quad \text{Equation (9)}$$

Equation (9) is an equation of a relationship that if the motor torque is T and the airflow is Q, the motor speed becomes S. If in equation (9), airflow Q is set airflow $Q^*$, and motor speed S is target motor speed Sa, equation (6) is given. Thus, motor-speed target value arithmetically-operating unit 13a performs processing for finding, using equation (6), target motor speed Sa necessary for attaining the set airflow $Q^*$, if the motor torque is T.

In FIG. 2, target motor speed Sa found in motor-speed target value arithmetically-operating unit 13a is subtracted from motor speed S, and a resultant value is multiplied by K of gain 13b, and a value obtained by adding motor speed S to the resultant value is instruction speed $S^*$. In other words, in motor-speed arithmetically-operating device 13, arithmetical operation of equation (10) is performed.

$$S^* = S + K \times \left\{ S - \sum_{n=0}^{j} \left( \sum_{m=0}^{i} (k_{nm} T^n Q^{*m}) \right) \right\}$$ Equation (10)

Equation (10) leads to the operation so that motor speed S becomes closer to target motor speed Sa.

Hereinafter, a description is given particularly with i=1, j=2 in equation (10). In this case, equation (10) is developed to equation (11).

$$S^* = S + K \times \{ S - ((k_{21} \times T^2 \times Q^*) + (k_{20} \times T^2) + (k_{11} \times T \times Q^*) + (k_{10} \times T) + (k_{01} \times Q^*) + k_{00}) \}$$ Equation (11)

Proportional gain K of gain 13b is a value that does not allow oscillation when the speed control is performed. The instruction-speed arithmetic operation is performed periodically, for example, 10 times per second.

Moreover, motor-speed arithmetically-operating device 13 has storage 13d (hereinafter, referred to as a memory) made up of an RAM, an ROM and the like. The set airflow is stored in the ROM in advance, and in performing the above-described arithmetic operation, motor-speed target value arithmetically-operating unit 13a reads out the set airflow from the ROM to use the arithmetic operation. A plurality of set airflows may be stored. In this case, switch 13e provided in motor-speed arithmetically-operating device 13 is manually operated to thereby select one of the plurality of set airflows stored. Furthermore, motor-speed arithmetically-operating device 13 can communicate with external equipment through communication unit 13f. Also, through the use of communication unit 13f, one of the plurality of set airflows can be selected by the communication from outside.

Moreover, the set airflow does not need to be stored in the ROM in advance. The set airflow may be transmitted to motor-speed arithmetically-operating unit 13 through communication unit 13f by the communication from outside as needed. In this case, the set airflow sent by the communication is stored in the RAM or the like in memory 13d, and is updated every time a new set airflow is sent.

Figure 3:
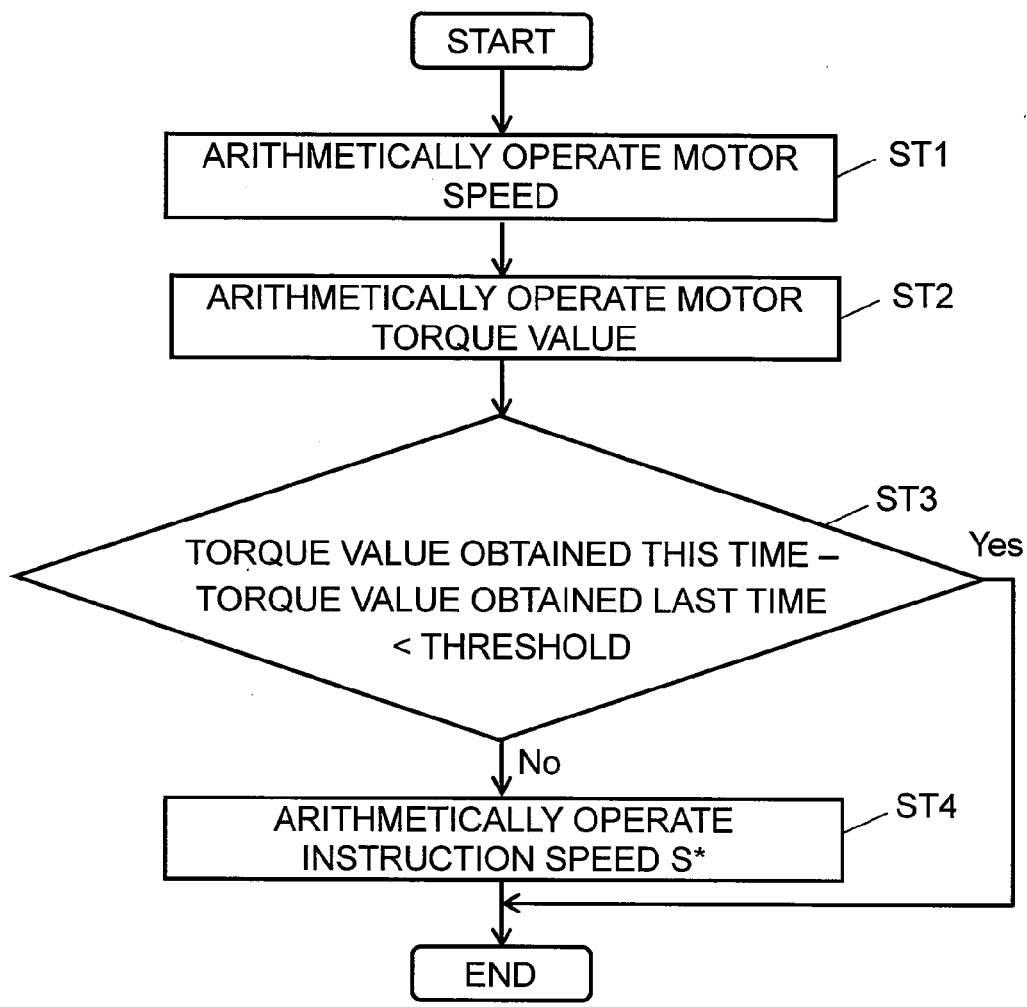
FIG. 3 is a flowchart showing processing of the motor-speed arithmetically-operating device in the first embodiment of the present invention.

FIG. 3 is a flowchart showing the above-described processing of motor-speed arithmetically-operating device 13. Motor-speed arithmetically-operating device 13 performs the processing shown in FIG. 3, for example, 10 times per second. That is, motor-speed arithmetically-operating device 13 is started 10 times per second to perform the processing shown in FIG. 3. Motor-speed arithmetically-operating device 13 first calculates the motor speed based on a signal from motor-speed detecting unit 11 (step ST 1). Subsequently, motor-speed arithmetically-operating device 13 calculates a motor torque value based on a signal from current detecting unit 12 (step ST2). Motor-speed arithmetically-operating device 13 compares the obtained torque value and the torque value found last time, and if a difference therebetween is slight, it ends the processing (step ST3). The torque comparison processing will be described in detail later. If the torque difference exceeds a threshold, the motor-speed arithmetically-operating device 13 performs the arithmetic operation of the above-described equation using the obtained motor speed and the motor torque value to calculate instruction speed S* and output the same (step ST4).

Next, a case where the above-described motor with the fan is installed, for example, as a blower of an air conditioner for general household is described.

First, a motor is connected to a wind-tunnel experiment facility, and the motor is actually operated to find constants k21, k20, k11, k10, k01, k00. Inside the wind tunnel, various static pressures can be realized, and under the different static pressures, the airflow is measured while the motor speed is varied. That is, the variation of the static pressure creates different operating environments. Table 1 shows a portion of data used when constants k21, k20, k11, k10, k01, k00 are found, and Table 2 shows constants k21, k20, k11, k10, k01, k00, which have been calculated using the above-mentioned data.

TABLE 1

| MOTOR SPEED [r/min] | STATIC PRESSURE [inchAq] | MOTOR TORQUE [Nm] | AIRFLOW [CMF] |
| --- | --- | --- | --- |
| 100 | 0.0 | 0.70 | 868.9 |
| 100 | 0.1 | 0.51 | 674.6 |
| 100 | 0.2 | 0.26 | 307.3 |
| 100 | 0.3-1.0 | ... | ... |
| 200 | 0.0 | 1.00 | 1059.6 |
| 200 | 0.1 | 0.82 | 904.2 |
| 200 | 0.2 | 0.64 | 717.0 |
| 200 | 0.3-1.0 | ... | ... |
| 300-900 | 0.0-1.0 | ... | ... |
| 1000 | 0.0 | 2.28 | 1331.6 |
| 1000 | 0.1 | 2.08 | 1218.5 |
| 1000 | 0.2-1.0 | ... | ... |

TABLE 2

VALUES OBTAINED BY APPLYING DATA OF TABLE 1 TO EQUATION (13) AND USING METHOD OF LEAST SQUARES $k_{21}$ = 1.3546E−01
$k_{20}$ = −3.0596E+02
$k_{11}$ = −4.0813E−01
$k_{10}$ = 1.6273E+03
$k_{01}$ = −7.3921E−01
$k_{00}$ = 3.5088E+0.2

In order to obtain the data of Table 1, the motor is subjected to speed control, and the data of the motor speed, the airflow and the motor torque when an instruction value of the motor speed is set every 100 r/min from 100 r/min to 1000 r/min, and the static pressure is changed every 0.1 inchAq from 0.0 inchAq to 1.0 inchAq are acquired. When the data of the motor speed, the motor torque and the airflow of Table 1 are applied to equation (9) to use a method of least squares, constants k21, k20, k11, k10, k01, k00 are found as in Table 2. Found constants k21, k20, k11, k10, k01, k00 are written in the memory such as the ROM inside motor-speed target value arithmetically-operating unit 13a.

Figure 4:
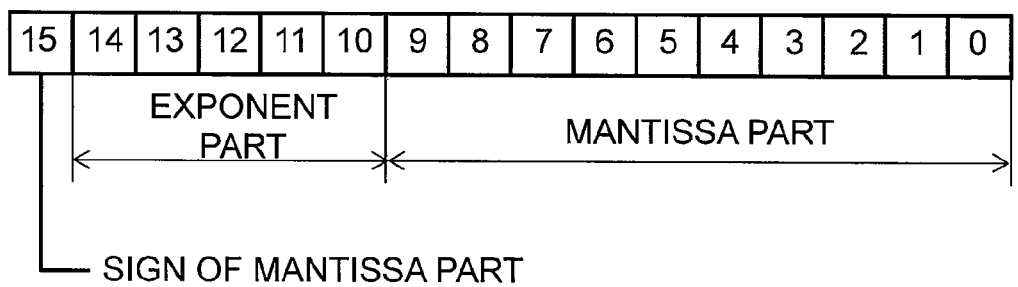
FIG. 4 is a diagram showing one example of data configuration of a coefficient in the first embodiment of the present invention.

FIG. 4 shows a data format of each of constants k21, k20, k11, k10, k01, k00. The data is of 16 bits for one constant. A most significant bit (bit 15) indicates a sign of a mantissa part with 0 representing positive, and 1 representing negative. Bits 10 to 14 indicate an exponent part, with a negative value giving a complement of 2. Bits 0 to 9 indicate an absolute value of the mantissa part, thereby assuming a value of 0 to 1023, and if the mantissa assumes a larger value than 1023, a 4-th digit is rounded so that an essential figure is set to that of triple digits. Values resulting from converting the values of Table 2 in this manner are shown in Table 3.

TABLE 3

VALUES OBTAINED BY CONVERTING
VALUES OF TABLE 2

$k_{21} = 351$
$k_{20} = -2333$
$k_{11} = 1187$
$k_{10} = -2664$
$k_{01} = -32462$
$k_{00} = 29831$

In the case where a processor is used as motor-speed target value arithmetically-operating unit 13a, if the coefficients of Table 2 are used as they are, a storage capacity of 4 or more bytes is needed for C language or the like. The conversion as described before, however, brings about a smaller storage capacity of 2 bytes, so that the less storage capacity of the ROM or the like that stores constants k21, k20, k11, k10, k01, k00 suffices. Which bit is to be used which application does not particularly matter, and for example, a least significant bit (bit 0) may be used for the sign of the mantissa. Moreover, the sign of the mantissa and the absolute value of the mantissa are lumped so that 11 bits are used to represent the complement of 2. Moreover, the constant data does not need to be of 16 bits, but for example, the data may be of 15 bits with 10 bits of mantissa, and 5 bits of exponent, or the data may be of 17 bits with 10 bits of mantissa and 7 bits of exponent.

When the static pressure is small, so high a motor speed is not needed for outputting the set airflow, the motor speed becomes a very low speed. Moreover, depending on the values of constants k21, k20, k11, k10, k01, k00, instruction speed S* as the output of motor-speed arithmetically-operating device 13 may be outputted with a negative value, and in this case, the motor is rotated reversely. In such a case, since the motor is rotated reversely, resulting in suction in spite of being the blowing system, a user may consider the device to have some trouble. In order to prevent this, providing a minimum motor speed as a lower limit for instruction speed S* of the motor can avoid the reverse rotation of the motor. In addition, providing a lower limit for the motor torque can bring about a similar effect.

On the contrary, when the static pressure is large, instruction speed S* of the motor as the output of motor-speed arithmetically-operating device 13 has an abnormally high value, which causes the possibility that a capability value of the motor is exceeded, or that the vibration of the fan and the motor is increased due to high-speed rotation of the motor, resulting in failure of the fan or the motor. Thus, providing an upper limit for instruction speed S* of the motor can avoid failure of the fan or the motor. In addition, providing an upper limit for the motor torque can bring about a similar effect.

Figure 5:
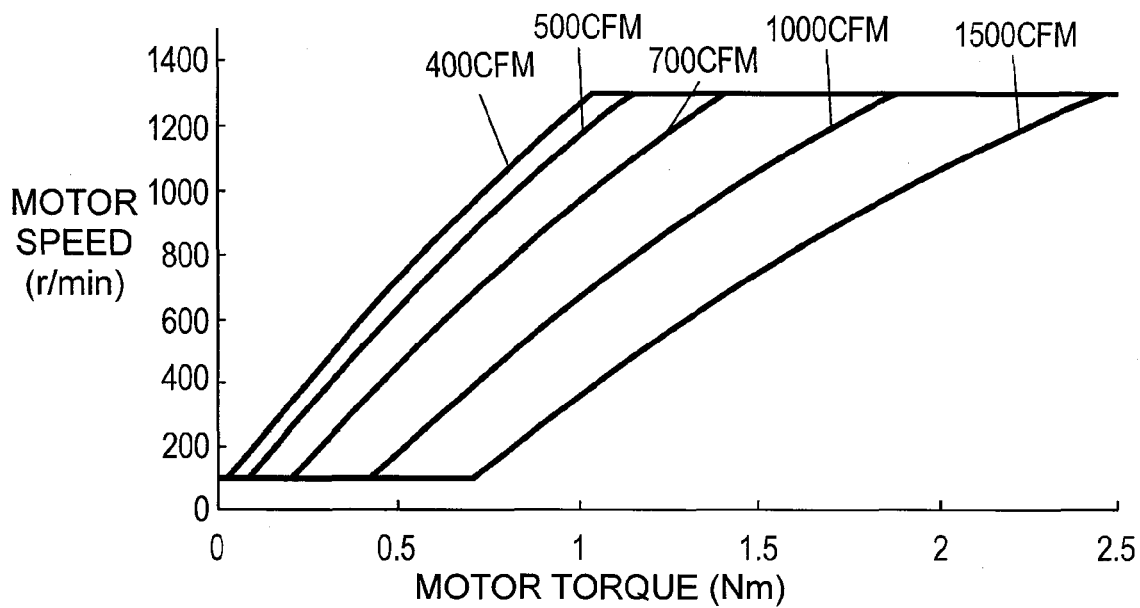
FIG. 5 is a graph showing one example of a relationship between a motor torque and a motor speed for attaining a predetermined airflow value in the first embodiment of the present invention.

FIG. 5 is a graph showing one example of a relationship between the motor torque and the motor speed to attain the predetermined airflow value. The output of motor-speed arithmetically operating device 13 when the lower limit and the upper limit are provided for the instruction speed of the motor is illustrated with a horizontal axis indicating the motor torque, with a vertical axis indicating the motor speed, in a case where the set airflow is varied from 400 to 1500 CFM.

Moreover, when the variation in an air-conditioning environment curve is small, so that the variation in the torque is minute, a dead band is provided for the torque detection so as not to perform the instruction-speed arithmetic operation, which enables more stable control. That is, as shown in the flowchart of FIG. 3, motor-speed arithmetically-operating device 13 attempts to calculate instruction speed S* of the motor 10 times per second. The motor torque value for use in the calculation is acquired before each calculation (step ST2). When motor-speed arithmetically-operating device 13 acquires the motor torque value, it compares the value with the motor torque value acquired last time, and if a difference therebetween is slight, the processing of FIG. 3 is finished, and the calculation for giving instruction speed S* of the motor is not performed (step ST3).

In this manner, by the target airflow being set, motor-speed arithmetically-operating device 13 with constants k21, k20, k11, k10, k01, k00 stored can calculate and output instruction speed S* using equation (10). The target airflow is decided based on an air-conditioning environment where the motor is installed. That is, the target airflow is decided depending on how much airflow needs to be sent into a room as a reference among rooms to be subjected to the air conditioning indoors, how much airflow is efficient for an air-conditioning facility, and the like. Moreover, the target airflow may be corrected in accordance with climate or the like of a region where the air-conditioning facility is installed. For example, in a temperate, humid region, the target airflow may be set to be higher. If the air-conditioning environment is known in advance, the target airflow can be set before the motor is installed. Obviously, it is possible to set the target airflow after the air-conditioning environment is checked at the time of installation.

Figure 6:
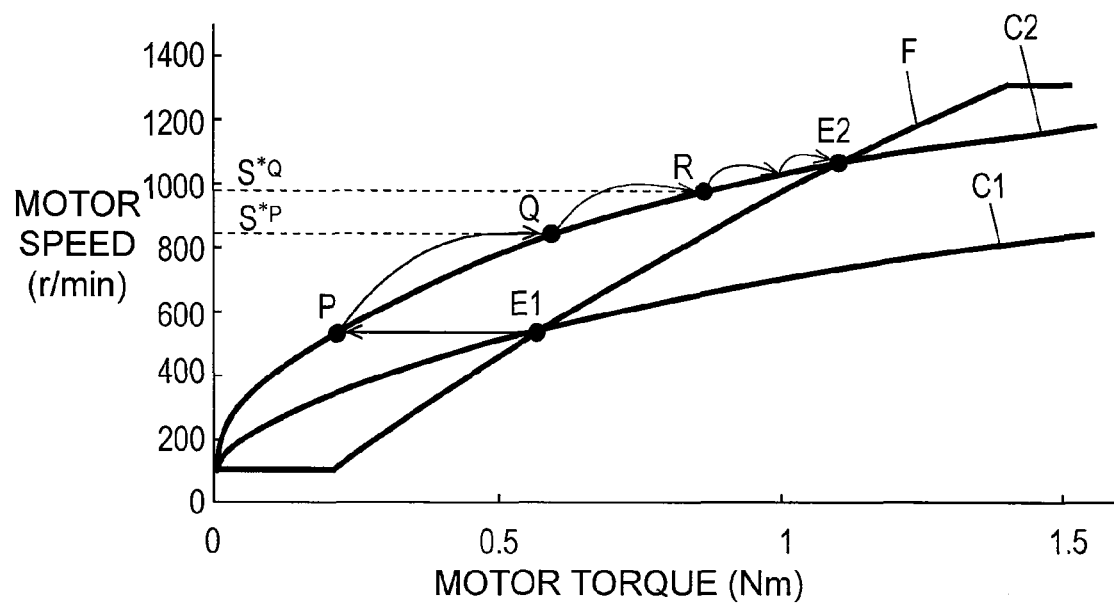
FIG. 6 is a graph for explaining a control method when an environment curve varies in the first embodiment of the present invention.

Next, control of the motor when the motor is rotated to operate the air-conditioning facility is described. In FIG. 6, curve F shows a relationship between the motor speed and the motor torque when the airflow is constant. The airflow is the target airflow set as described above, and the airflow always keeps the target airflow and constant as long as it is on the curve. In FIG. 6, the target airflow is set to 800 CFM as one example. Curve C1 specific to the air-conditioning environment intersects with airflow constant curve F. Motor-speed arithmetically-operating device 13 calculates the motor speed that is intersection E1 of airflow constant curve F and air-conditioning environment curve C1 as shown in FIG. 6, using the above-described equation (10), and instructs the rotation of the motor at a calculated speed.

Here, suppose that the air-conditioning environment is changed so that the environment curve is changed from C1 to C2. For instance, when a vent provided at the air outlet is opened or closed, so that a number of rooms to be subjected to the air conditioning is changed, the air-conditioning curve is changed. When clogging occurs in the filter, the air-conditioning curve is also changed. The change of the air-conditioning environment to C2 moves an operation condition of the motor from point E1 to point P on curve C2. The movement causes the airflow to deviate from the target airflow. As described above, the instruction-speed arithmetic operation is performed periodically, for example, 10 times per second. Accordingly, in the arithmetic operation immediately after the operation condition moves to point P, new instruction speed $S^{*P}$ is calculated by motor-speed arithmetically-operating device 13. This changes the motor speed to move the operation condition to Q.

In point Q, further new instruction speed $S^{*Q}$ is calculated, which changes the motor speed to move the operation condition to point R. This is repeated, and finally, the motor speed is settled in the motor speed indicated by intersection E2 of air-conditioning environment curve C2 and airflow constant curve F. When the air-conditioning environment returns from C2 to C1, a process goes opposite direction of the above-described process, in which the motor speed moves along curve C1 to return to intersection E1. A change process through which the motor speed converges differs depending on the value of proportional gain 13b, K. For instance, when the value of proportional gain 13b, K is small, the change in the speed calculated in the consecutive calculation is small, and thus, a number of the changes in the speed shown in FIG. 6 till the convergence is reached is large. That is, it takes long to reach the convergence.

On the other hand, when proportional gain 13b, K is large, the calculated instruction speed overleaps the intersection of the air-conditioning environment curve and the airflow predetermined curve, and thus, the speed is never stabilized, and the target airflow cannot be reached. Proportional gain 13b, K is set so as to prevent this. Specifically, an experiment is conducted while changing the value of the gain to find an optimal value. An experiment conducted by the inventor of the present invention shows that the optimal value of the gain is 0.2, however, it is merely one example.

(Second Embodiment)

Figure 7:
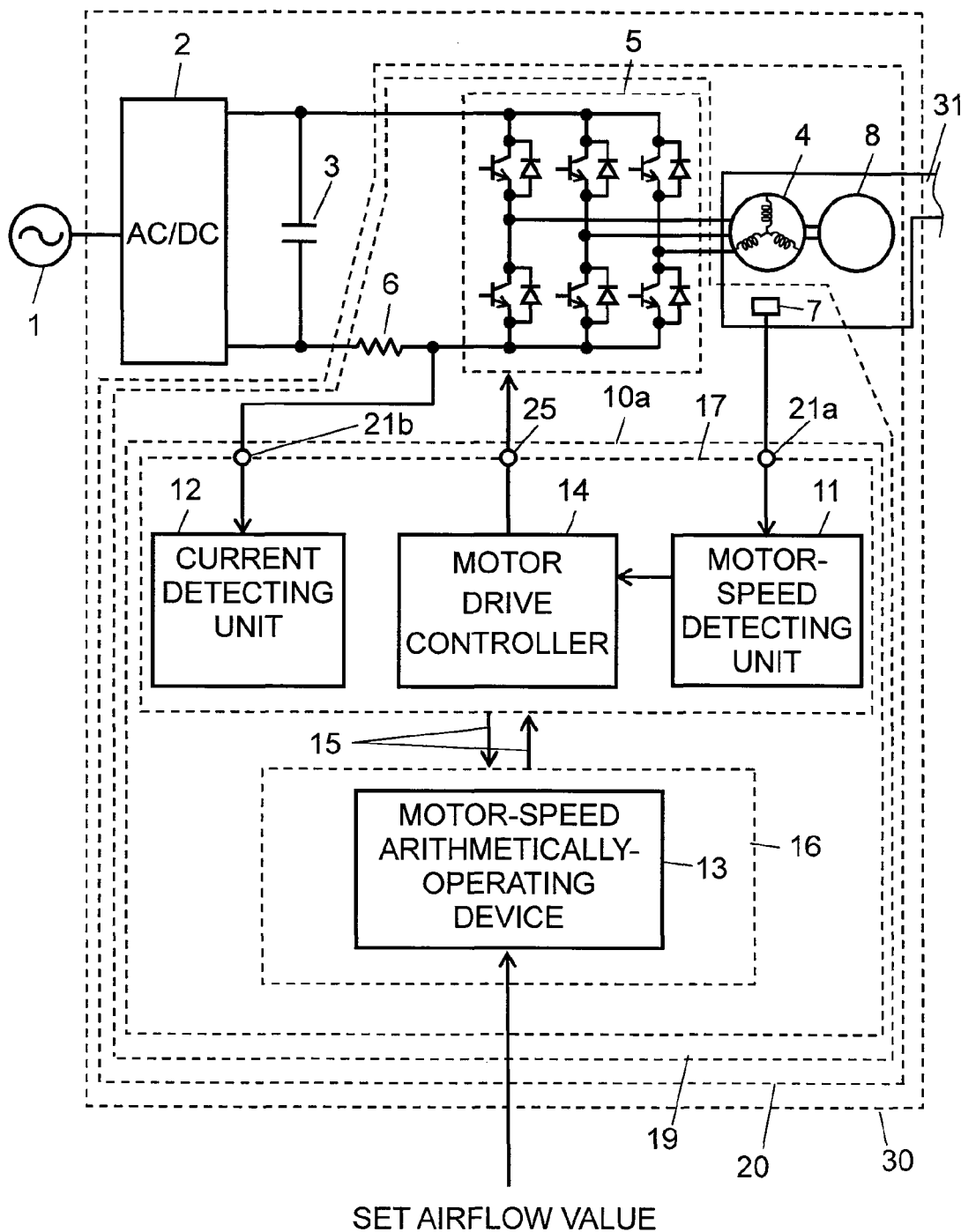
FIG. 7 is a block diagram showing a configuration of a second embodiment of the present invention.

FIG. 7 is a block diagram showing a configuration of a second embodiment of the present invention. Configuration elements having the same functions as those in the first embodiment are given the same reference symbols, and detailed descriptions thereof are not given. While in the configuration of the first embodiment shown in FIG. 1, the outputs of motor-speed detecting unit 11 and the current detecting unit 12 are inputted to motor-speed arithmetically-operating device 13, a configuration of the second embodiment as shown in FIG. 7 may be employed.

That is, motor control device 10a has first unit 16 including at least motor-speed arithmetically-operating device 13, and second unit 17 including at least input terminals 21a, 21b and output terminal 25. Second unit 17 further has motor-speed detecting unit 11 that detects the speed from speed sensor 7, current detecting unit 12 that detects the current of motor 4 from the signal of current detector 6, and motor drive controller 14 that controls the driving of the motor at the speed allowing the predetermined airflow value to be attained. Motor control device 10a has communication unit 15 that performs data communication between first unit 16 and second unit 17.

In FIG. 7, first unit 16 and second unit 17 can intercommunicate data by communication unit 15 such as a RS232C. The motor current detected in current detecting unit 12 and the motor speed detected in motor-speed detecting unit 11 in second unit 17 are sent to first unit 16 through communication unit 15. Using the data, motor-speed arithmetically-operating device 13 inside first unit 16 arithmetically operates instruction speed S* to send the same to motor drive controller 14 in second unit 17 through communication unit 15. Motor drive controller 14 performs speed control with instruction speed S* used as the instruction speed.

Next, with the inclusion of the first and second embodiments, common actions and alternative configurations of the present invention, and further development of the present invention are described.

While in the above-described embodiments, current detector 6 is inserted into the DC line to measure the motor current, a phase current of the motor may be directly detected. Moreover, d-q conversion may be performed using the phase current, and a q-axis current may be calculated to detect the motor torque. Moreover, since in the present invention, the instruction speed is arithmetically operated from the motor torque, the current including motor torque information only needs to be detected, and a similar effect can be brought about as long as the motor torque can be estimated regardless of a site where the current is detected.

Moreover, while the foregoing description has been given to the case where the product according to the invention is installed for general household, it may be installed in a building, a clean room, a vehicle, a bus, a railway vehicle, an aircraft, a ship and the like to be used for business purpose.

The motor is a brushless motor, an embedded magnet synchronous motor, an induction motor, a brushed motor or the like, and may be of any form of motor whose motor speed and the motor torque can be detected.

Since the method for controlling the motor is the speed control method, which makes the instruction speed and the motor speed almost equal, the calculation is performed as in equation (10) using motor speed S in motor-speed arithmetically-operating device 13 in FIG. 2. The calculation, however, may be performed as in equation (12) using instruction speed Sz* in a previous period instead of motor speed S.

$$S^n = Sz^* + K \times \left\{ Sz^* - \sum_{n=0}^{j} \left( \sum_{m=0}^{i} (K_{nm} T^n Q^{*m}) \right) \right\} \quad \text{Equation (12)}$$

Using the instruction speed as in equation (12) instead of the motor speed likely to fluctuate as in equation (11) increases the stability of the control.

Thus, according to the motor control device of the present invention, by utilizing the motor current detected using current detector 6, higher-precision airflow control can be realized against the change factors such as temperature change. Further, the simple control processing allows an inexpensive CPU for control processing to be used, thereby realizing a low cost of the product. Furthermore, the reduction in number of bytes to store the constants for use in the control expressions brings about less storage capacity, and allows a still lower cost to be realized.

Moreover, in the equation to find target motor speed Sa, the respective constants are of bits of a number not less than 2, at least one bit of which is used as a mantissa, and at least another bit of which is used as an exponent, thereby saving the memory for storing the constants.

Outputting the necessary instruction speed in the range between the minimum instruction speed and the maximum instruction speed can prevent failure of the motor or the fan due to reverse rotation or over-rotation of the motor.

Moreover, when the difference between the motor torque and the motor torque obtained last time is slight, the calculation processing of the instruction speed is not performed, which prevents the problem that the speed, that is, the airflow is never stabilized or the like.

Still further, having the memory that stores the predetermined airflow value enables the configuration in which the predetermined airflow value does not need to be provided from outside.

By having the memory that stores the plurality of airflow values to be able to select one of the plurality of airflow values by the switch, the user can easily select the desired, predetermined airflow value.

Moreover, by having the communication unit that receives a selection signal, the desired, predetermined airflow values can be selected from remote location.

In the air conditioner to which the above-described motor device is applied, the airflow can be kept constant even when the static pressure varies. Further, in the air conditioner installed in a house for general household, the airflow can be kept at the predetermined value even when the static pressure varies due to clogging of the filter or the like. Also, in the air conditioner installed in a building, the airflow can be kept at the predetermined value even when the static pressure varies due to the opening and closing of the air outlet.

INDUSTRIAL APPLICABILITY

The motor control device of the present invention is the most suitable to a system that controls an airflow at a predetermined airflow value, and is useful as an air-conditioning facility of a house for general household, a business building, a vehicle or the like.

The invention claimed is:

1. A motor control device that controls a motor that drives a fan, comprising:
   an input terminal for inputting at least one of a first operation parameter indicating a motor speed and a second operation parameter indicating a motor torque;
   a motor-speed target value arithmetically-operating unit that calculates, using a predetermined airflow value and the motor torque, a necessary modified value for the motor speed at predetermined time intervals; and
   an output terminal that outputs an instruction speed of the motor based on the necessary modified value
   wherein the motor speed is controlled so that the predetermined airflow value is maintained,
   wherein the necessary modified value is obtained by multiplying a difference between the motor speed and a target value of the motor speed by a gain; or
      the necessary modified value is obtained by multiplying a difference between an instruction speed found last time and a target value of the motor speed by a gain,
   wherein the target value is found from the motor torque and the predetermined airflow value.

2. The motor control device according to claim 1, wherein the first operation parameter is outputted by a first detector that detects the motor speed.

3. The motor control device according to claim 1, wherein the second operation parameter is outputted by a second detector that detects a current of the motor.

4. The motor control device according to claim 1 further comprising a motor drive controller that drives the motor in accordance with the instruction speed, and controls the motor speed at a speed allowing the predetermined airflow value to be attained.

5. The motor control device according to claim 1, wherein the target value (Sa) is found by equation (13) below:

$$Sa = \sum_{n=0}^{j}\left(\sum_{m=0}^{i}(k_{nm}T^{n}Q^{*m})\right) \qquad \text{Equation (13)}$$

where T is the motor torque, Q* is the predetermined airflow value, knm (n=0, 1, 2, ..., j, m=0, 1, 2, ..., i) is a constant, and i and j are finite values.

6. The motor control device according to claim 1 wherein the instruction speed is found from a sum of the motor speed and the necessary modified value.

7. The motor control device according to claim 6, wherein the instruction speed (S*) is found by equation (14) below:

$$S^{*} = S + K \times \left\{ S - \sum_{n=0}^{j}\left(\sum_{m=0}^{i}(k_{nm}T^{n}Q^{*m})\right)\right\} \qquad \text{Equation (14)}$$

where S is the motor speed, T is the motor torque, Q* is the predetermined airflow value, K is a gain, knm (n=0, 1, 2, ..., j, m=0, 1, 2, ..., i) is a constant, and i and j are finite values.

8. The motor control device according to claim 5, wherein with the finite values i and j, i=1 and j=2.

9. The motor control device according to claim 5, wherein the constant is represented by bits of at least a bit number not less than 2, at least one bit of which is used as a mantissa, and at least another bit of which is used as an exponent.

10. The motor control device according to claim 5, wherein the constant is represented by 16 bits of data.

11. The motor control device according to claim 5, wherein the constant is found by a method of least squares using the motor torque, the motor speed, and the data of the predetermine airflow value.

12. The motor control device according to claim 1, wherein the instruction speed is found from a sum of the instruction speed found last time and the necessary modified value.

13. The motor control device according to claim 1, wherein the motor-speed arithmetically-operating device stores a minimum instruction speed and a maximum instruction speed, and outputs the instruction speed in a range between the minimum instruction speed and the maximum instruction speed.

14. The motor control device according to claim 1, wherein the motor-speed arithmetically-operating device compares the motor torque and the motor torque obtained last time to calculate the necessary modified value.

15. The motor control device according to claim 1 further comprising a memory that stores the predetermined airflow value.

16. The motor control device according to claim 15, wherein the memory stores a plurality of airflow values, and one of the plurality of airflow values is selected as the predetermined airflow value.

17. The motor control device according to claim 16 further comprising a switch operated manually, and the predetermined airflow value is selected from the plurality of airflow values by operation of the switch.

18. The motor control device according to claim 16 further comprising a communication unit that receives a selection signal and the predetermined airflow value is selected from the plurality of airflow values by the selection signal.

19. The motor control device according to claim 1 further comprising a communication unit that receives a signal to instruct the predetermined airflow value.

20. The motor control device according to claim 1 comprising a first unit having at least the motor-speed arithmetically-operating device, and a second unit having at least the input terminal and the output terminal, wherein data communication is performed between the first unit and the second unit.

21. The motor control device according to claim 20, wherein the data communication includes at least one of the first parameter, the second parameter, and the instruction speed.

* * * * *